United States Patent
Kaplinger et al.

(10) Patent No.: US 9,706,002 B2
(45) Date of Patent: *Jul. 11, 2017

(54) PUSH NOTIFICATION VIA FILE SHARING SERVICE SYNCHRONIZATION

(71) Applicant: International Business Machines Corporation, Armonk, NY (US)

(72) Inventors: Todd E. Kaplinger, Raleigh, NC (US); Craig A. Lanzen, Lambertville, MI (US); Michael R. Rheinheimer, Cedar Park, TX (US); Brian L. White Eagle, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 439 days.

This patent is subject to a terminal disclaimer.

(21) Appl. No.: 13/945,196

(22) Filed: Jul. 18, 2013

(65) Prior Publication Data
US 2015/0026237 A1    Jan. 22, 2015

(51) Int. Cl.
*H04L 29/08* (2006.01)
*H04L 29/06* (2006.01)
(Continued)

(52) U.S. Cl.
CPC ........ *H04L 67/26* (2013.01); *G06F 17/30174* (2013.01); *H04L 7/0079* (2013.01);
(Continued)

(58) Field of Classification Search
CPC ............. G06F 17/30174; G06F 9/5033; G06F 9/5027; G06F 9/5083; G06F 11/16;
(Continued)

(56) References Cited

U.S. PATENT DOCUMENTS 5,357,510 A   10/1994   Norizuki et al.
5,473,680 A   12/1995   Porter
(Continued)

FOREIGN PATENT DOCUMENTS

CN    102420827    4/2012

OTHER PUBLICATIONS

Ip.com, "Intelligent Notification Channel Selector", IP.com #:000221942, Sep. 17, 2012, Authors: Disclosed Anonymously, An IP.com Prior Art Database Technical Disclosure, 3 pages.*

(Continued)

*Primary Examiner* — Kamal Divecha
*Assistant Examiner* — Clifton Houston
(74) *Attorney, Agent, or Firm* — Cantor Colburn LLP; Nicholas Bowman

(57) ABSTRACT

Embodiments relate to push notification via file sharing service synchronization. A system includes a computer processor and a mobile platform server executable by the computer processor. The mobile platform server includes a notification service configured to establish synchronization with a client-to-server directory of a file sharing container of a client mobile device via a file sharing service. The notification service is further configured to detect a notification from the client mobile device in the client-to-server directory and to determine an endpoint associated with the notification and a notification transport protocol associated with the endpoint. The notification service is also configured to select a channel plugin associated with the notification transport protocol to establish a notification channel with the endpoint and to send a notification trigger on the notification channel to the endpoint based on the notification.

14 Claims, 5 Drawing Sheets

(51) Int. Cl.
*H04W 4/12* (2009.01)
*H04L 7/00* (2006.01)
*G06F 17/30* (2006.01)

(52) U.S. Cl.
CPC .......... *H04L 67/06* (2013.01); *H04L 67/1095* (2013.01); *H04L 67/42* (2013.01); *H04W 4/12* (2013.01)

(58) Field of Classification Search
CPC ... H04L 67/1095; H04L 67/06; H04L 7/0079; H04L 67/42; H04L 67/26; H04L 67/2842; H04L 41/0604; H04L 41/50; H04L 69/08; H04L 29/06047; H04L 29/08162; H04L 29/08225; H04L 29/08522; H04L 29/0872; H04L 67/1002; H04L 67/1091; H04L 29/06537; H04L 67/104; H04L 47/125; H04W 4/12; H04W 28/08; H04N 21/23103
See application file for complete search history.

(56) References Cited

U.S. PATENT DOCUMENTS

| | | | |
|---|---|---|---|
| 6,401,099 B1 | 6/2002 | Koppolu et al. | |
| 6,928,051 B2 | 8/2005 | Butt et al. | |
| 7,680,035 B2 | 3/2010 | Krishnan | |
| 7,685,633 B2 | 3/2010 | Ben-Shachar et al. | |
| 7,769,046 B1 | 8/2010 | Crocker | |
| 8,023,934 B2 | 9/2011 | Jeide et al. | |
| 8,107,406 B2 | 1/2012 | Huang et al. | |
| 8,144,586 B2 | 3/2012 | McNaughton et al. | |
| 8,219,067 B1 | 7/2012 | Haldar et al. | |
| 8,279,878 B2 | 10/2012 | Takashige et al. | |
| 2003/0037335 A1 | 2/2003 | Gatto et al. | |
| 2005/0226430 A1 | 10/2005 | Kreifeldt et al. | |
| 2005/0261923 A1 | 11/2005 | Brown et al. | |
| 2006/0286993 A1 | 12/2006 | Xie et al. | |
| 2007/0022198 A1* | 1/2007 | Messer | H04L 67/26 709/227 |
| 2007/0106739 A1* | 5/2007 | Clark | H04L 12/587 709/206 |
| 2008/0005188 A1* | 1/2008 | Li | G06F 17/30174 |
| 2009/0204681 A1 | 8/2009 | Sun | |
| 2009/0247134 A1* | 10/2009 | Jeide | H04L 67/2842 455/414.2 |
| 2010/0073160 A1 | 3/2010 | Gilmour et al. | |
| 2010/0241760 A1 | 9/2010 | Zhang et al. | |
| 2010/0257451 A1* | 10/2010 | Halevi | G06F 15/16 715/733 |
| 2010/0268767 A1 | 10/2010 | McColgan et al. | |
| 2011/0040895 A1* | 2/2011 | Griffin | H04L 67/1095 709/248 |
| 2011/0060996 A1 | 3/2011 | Alberth, Jr. et al. | |
| 2011/0078318 A1 | 3/2011 | Desai et al. | |
| 2011/0169632 A1 | 7/2011 | Walker et al. | |
| 2011/0173681 A1 | 7/2011 | Qureshi et al. | |
| 2011/0264778 A1 | 10/2011 | McGregor et al. | |
| 2012/0071178 A1 | 3/2012 | Sun et al. | |
| 2012/0173610 A1 | 7/2012 | Bleau et al. | |
| 2012/0179767 A1 | 7/2012 | Clarke et al. | |
| 2012/0198268 A1 | 8/2012 | Qureshi | |
| 2012/0259918 A1 | 10/2012 | Bringer et al. | |
| 2013/0013560 A1* | 1/2013 | Goldberg | G06F 17/30174 707/634 |
| 2013/0013804 A1* | 1/2013 | Traynor | H04L 67/26 709/232 |
| 2013/0054706 A1 | 2/2013 | Graham et al. | |
| 2013/0268480 A1* | 10/2013 | Dorman | G06F 17/30575 707/608 |
| 2013/0332522 A1 | 12/2013 | Tang et al. | |
| 2013/0332538 A1* | 12/2013 | Clark | H04L 51/14 709/206 |
| 2013/0346521 A1 | 12/2013 | Arabo et al. | |
| 2014/0201289 A1* | 7/2014 | Wheeler | H04L 12/58 709/206 |
| 2014/0337464 A1 | 11/2014 | McGarva et al. | |
| 2014/0364103 A1 | 12/2014 | Marti et al. | |
| 2015/0019654 A1 | 1/2015 | Wheeler et al. | |
| 2015/0024793 A1* | 1/2015 | Kaplinger | H04L 69/18 455/466 |
| 2015/0024794 A1* | 1/2015 | Kaplinger | G06F 17/30174 455/466 |
| 2015/0026324 A1* | 1/2015 | Rheinheimer | H04L 41/0604 709/223 |
| 2015/0026325 A1* | 1/2015 | Rheinheimer | H04L 41/0604 709/223 |
| 2015/0026356 A1* | 1/2015 | Kaplinger | H04L 69/18 709/230 |

OTHER PUBLICATIONS

Non-Patent Literature: "Intelligent Notification Channel Selector", IP.com #:000221942, Sep. 17, 2012, Authors: Disclosed Anonymously, An IP.com Prior Art Database Technical Disclosure, 3 pages.*
IP.com, "Intelligent Notification Channel Selector," IP.com number: IPCOM000221942D, Sep. 17, 2012, 3 pages.
Mahesh Sooriyabandara et. al., Unified Link Layer API: A generic and open API to manage wireless media access, Computer Communications, v 31, n 5, p. 962-979, Mar. 25, 2008, Elsevier.

* cited by examiner

PUSH NOTIFICATION VIA FILE SHARING SERVICE SYNCHRONIZATION

BACKGROUND

The present disclosure relates to communication interfaces and, more specifically, to push notification via file sharing service synchronization in a mobile communication environment.

In a mobile environment, devices that run applications can generate and consume events that interact with remote applications. Some mobile device applications can run in a disconnected mode such that users may continue operation of the mobile device applications when a network connection is degraded or lost. When such mobile device applications need to interact with remotely located enterprise applications there is not a standardized approach to ensure that actions are properly sequenced and performed in order to efficiently complete the actions once network service is restored. Further complications exist due to the number of different protocols associated with various types of mobile devices across a mobile environment. As applications are written that interface to a variety of mobile devices, it can be challenging to handle a diverse body of notification mechanisms for compatibility across the various mobile devices.

SUMMARY

According to an embodiment, a system for push notification via file sharing service synchronization is provided. The system includes a computer processor and a mobile platform server executable by the computer processor. The mobile platform server includes a notification service configured to establish synchronization with a client-to-server directory of a file sharing container of a client mobile device via a file sharing service. The notification service is further configured to detect a notification from the client mobile device in the client-to-server directory and to determine an endpoint associated with the notification and a notification transport protocol associated with the endpoint. The notification service is also configured to select a channel plugin associated with the notification transport protocol to establish a notification channel with the endpoint and to send a notification trigger on the notification channel to the endpoint based on the notification.

According to another embodiment, a computer program product for push notification via file sharing service synchronization is provided. The computer program product includes a computer readable storage medium having program code embodied therewith. The program code is executable by a processing device for establishing synchronization with a client-to-server directory of a file sharing container of a client mobile device via a file sharing service. The program code is also executable by the processing device for detecting a notification from the client mobile device in the client-to-server directory and determining an endpoint associated with the notification and a notification transport protocol associated with the endpoint. The program code is further executable by the processing device for selecting a channel plugin associated with the notification transport protocol to establish a notification channel with the endpoint and sending a notification trigger on the notification channel to the endpoint based on the notification.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to push notification via file sharing service synchronization in a mobile communication environment. Push notification forwards notifications to mobile devices. The notifications can include various types of data, audio, or text alerts and may trigger an update or further action by the recipient. When a notification is received on a mobile device, a specified action may require the mobile device to connect to an application server to retrieve information or take further action on awaiting information.

In exemplary embodiments, push notification middleware provides a notification framework that is dynamic and supports registering and un-registering of notification channels and endpoints. Notification channels may be defined to support a variety of notification transport protocols. Endpoints are targeted recipients of push notifications. The push notification middleware is pluggable to support multiple notification transport protocols which can be modified over time. The push notification middleware is optimized for a mobile communication environment, where notification delivery is not guaranteed and expected to have low latency. In exemplary embodiments, a file sharing service is utilized by the push notification middleware for synchronizing simple message delivery between a client mobile device, the push notification middleware, and target device(s), where a notification transport protocol and target device(s) need not be known by the client mobile device. The framework for simple message delivery is extensible and therefore capable of receiving additional metadata to support modifications and additions to the notification transport protocols.

The push notification middleware may provide push notification based on triggers and/or topic publishing. Exemplary embodiments support loose coupling of triggering and delivery, where a notification channel for push notification delivery need not be known by the client mobile device. For example, a notification may only include an application and a user. The pluggable framework enables support for new notification channels to be added over time with no changes to devices that initiate triggers. Loose coupling may reduce changes needed within the push notification middleware and isolates changes to the plugins. The push notification middleware may also include one or more application programming interfaces (APIs) to optionally add advanced interfaces, such as publish/subscribe support.

Figure 1:
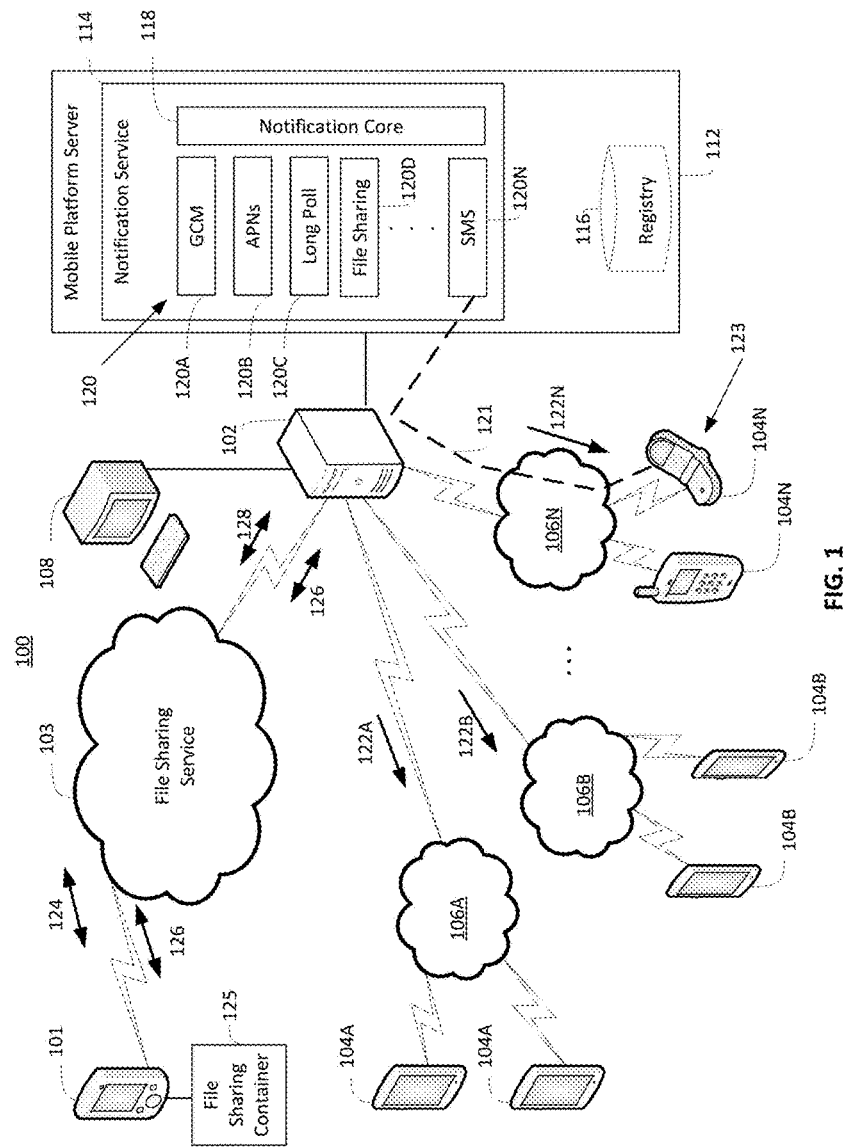
FIG. 1 depicts a block diagram of a system upon which push notification may be implemented according to an embodiment.

Turning now to FIG. 1, an example of a system 100 upon which push notification may be implemented will now be described in greater detail. The system 100 represents a mobile communication environment. In the example depicted in FIG. 1, the system 100 includes a server system 102 configured to communicate with a client mobile device 101 via a file sharing service 103. The server system 102 is also configured to communicate with one or more target mobile devices 104A-N over a plurality of communication networks 106A-N. In exemplary embodiments, the server system 102 is a high-speed processing device (e.g., a mainframe computer, a desktop computer, a laptop computer, a hand-held device, an embedded computing device, or the like) including at least one processing circuit (e.g., a computer processor/CPU) capable of reading and executing instructions, and handling interactions with various components of the system 100.

The client mobile device 101 is a mobile computing device with one or more processing circuits and I/O interfaces, such as keys/buttons, a touchscreen, audio input, a display device and audio output. The client mobile device 101 can be any type of computing device capable of interfacing with the file sharing service 103. The file sharing service 103 may be a cloud-based file sharing system that enables users to store and share files and folders with others across a network or mobile environment using file synchronization. File synchronization can be established using directories with callbacks that enable data to be returned, where a callback can be an event indicating that new or modified data are available for pickup in the directory.

In exemplary embodiments, the target mobile devices 104A-N, each generally referred to as a target mobile device 104, can include a variety of mobile handsets and mobile computing devices with processing circuits and I/O interfaces, such as a keys/buttons, a touchscreen, audio input, a display device and audio output. In the example depicted in FIG. 1, the target mobile devices 104A-N support push notification using a variety of notification transport protocols. The client mobile device 101, server system 102, file sharing service 103, and target mobile devices 104A-N can include various computer/communication hardware and software technology known in the art, such as one or more processing units or circuits, volatile and non-volatile memory including removable media, power supplies, network interfaces, support circuitry, operating systems, and the like. The server system 102 may also include one or more user interfaces 108 with user accessible I/O devices, such as a keyboard, mouse, and display.

The communication networks 106A-N may be any type of communication networks known in the art. The communication networks 106A-N can include a combination of wireless, wired, and/or fiber optic links. The communication networks 106A-N may support a variety of known communication standards that allow data to be transmitted wirelessly between the server system 102 and the target mobile devices 104A-N. Additional computer systems, such as gateways (not depicted), may also interface with the server system 102 and the target mobile devices 104A-N via the communication networks 106A-N or other networks. The gateways (not depicted) may provide protocol conversion and implementation-specific support as needed between the server system 102 and one or more of the target mobile devices 104A-N.

In exemplary embodiments, the server system 102 includes a mobile platform server 112, which is an example of push notification middleware. The mobile platform server 112 includes a notification service 114 and a registry 116. The notification service 114 includes a notification core 118 that interfaces with a plurality of channel plugins 120. The notification core 118 is pluggable to support multiple notification transport protocols as defined via the channel plugins 120. Each of the channel plugins 120 may support a particular notification transport protocol. In the example of FIG. 1, channel plugin 120A supports Google™ Cloud Messaging (GCM), channel plugin 120B supports Apple™ Push Notification Service (APNs), and channel plugin 120N supports Short Message Service (SMS). Channel plugin 120C is an example of a customized notification transport protocol that is referred to as Long Poll. Channel plugin 120D, also referred to as file sharing channel plugin 120D, is configured to provide file sharing support via file sharing synchronization through the file sharing service 103. Each of the channel plugins 120 can be used to establish channels for push notification to the target mobile devices 104A-N.

Each of the communication networks 106A-106N may be associated with one or more of the channel plugins 120; however, there need not be a one-to-one relationship between the communication networks 106A-106N and the channel plugins 120A-N of FIG. 1. In one example, channel plugin 120A sends a notification trigger 122A through communication network 106A to one or more target mobile devices 104A in a GCM-compatible format. Similarly, channel plugin 120B can send a notification trigger 122B through communication network 106B to one or more target mobile devices 104B in a APNs-compatible format. The Long Poll notification transport protocol of channel plugin 120C enables push notification on target mobile devices 104 that may not otherwise have an existing notification transport protocol defined, e.g., legacy mobile devices. Channel plugin 120N can send a notification trigger 122N through communication network 106N to one or more target mobile devices 104N in an SMS-compatible format. Although depicted separately, portions of the communication networks 106A-N and the file sharing service 103 may share some hardware and/or software based elements.

Figure 2:
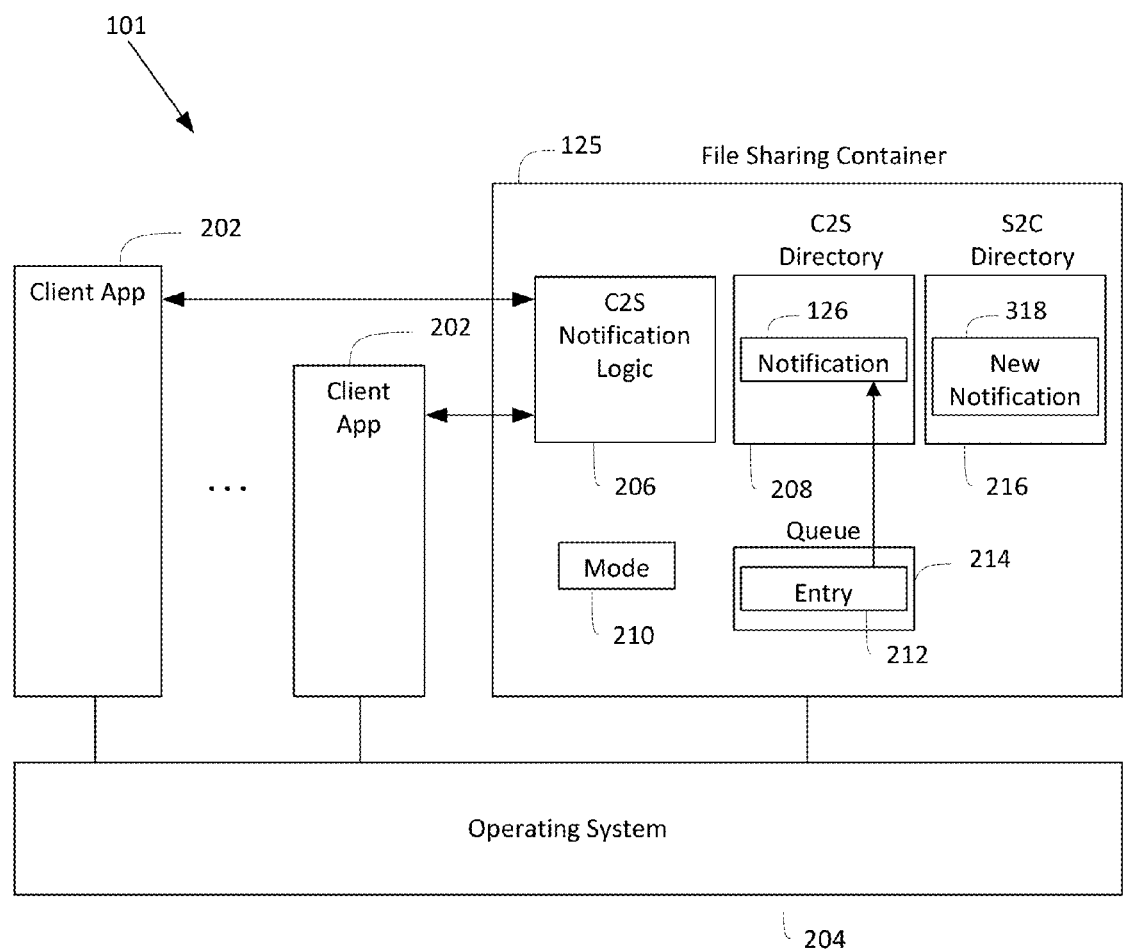
FIG. 2 depicts an example client mobile device for push notification according to an embodiment.

To target a specific endpoint, such as endpoint 123 on one of the SMS-compatible target mobile devices 104N, a notification channel 121 is established. The notification channel 121 routes traffic through communication network 106N between channel plugin 120N associated with the SMS notification transport protocol to send the notification trigger 122N with a payload between the notification service 114 and target mobile device 104N in this example. When an application of the client mobile device 101 desires to send a notification to the endpoint 123, the client mobile device 101 need not know the details of the notification channel 121 or the SMS notification transport protocol of channel plugin 120N. The client mobile device 101 establishes synchronization 124 between a client-to-server directory (as depicted in FIG. 2) of a file sharing container 125 of the client mobile device 101 and the file sharing service 103. A notification 126 stored in the file sharing container 125 is flowed to the file sharing service 103. The notification service 114 can use the channel plugin 120D for file sharing to establish synchronization 128 with the file sharing service 103 and receive the notification 126. The notification 126 can be a publish request targeting one or more endpoints and/or target mobile devices 104. In this example, the notification service 114 can access the registry 116 to determine that the endpoint 123 is associated with the notification 126, where SMS of channel plugin 120N is the notification transport protocol associated with the endpoint 123. The channel plugin 120N is selected and the notification trigger 122N is sent on the notification channel 121 to the endpoint 123 based on the notification 126.

In exemplary embodiments, the notification service 114 uses the registry 116 to track relationships between applications, users, and the target mobile devices 104A-N for push notification. The registry 116 can also coordinate which notification transport protocol and channel plugin 120 is associated with a particular endpoint. An endpoint, or notification endpoint, can be defined at a device level, e.g., one of the target mobile devices 104A-N, or at an application level, such as a particular application instance executing on one of the target mobile devices 104A-N. Accordingly, each of the target mobile devices 104A-N can have more than one endpoint defined in the registry 116.

The notification service 114 can support calls to the notification core 118 from application servers to trigger notifications which are mapped through the registry 116 to one or more endpoints and sent as push notifications. The mobile platform server 112 may also support publish/subscribe (pub/sub) notifications that enable an entity to subscribe to a topic and another entity to publish to the topic. For example, application instances on two or more of the target mobile devices 104A-N may subscribe to the same topic that is published by the client mobile device 101. Rather than sending data for the topic individually to the notification service 114 for each of the target mobile devices 104A-N, the client mobile device 101 can send a payload for the topic as part of the notification 126 through the file sharing service 103 to the notification service 114. The notification service 114 in turn sends notification triggers 122 to subscribed target mobile devices 104 using a compatible protocol for the target mobile devices 104 as defined through the channel plugins 120.

FIG. 2 depicts an example of the client mobile device 101 of FIG. 1 for push notification according to an embodiment. In the example of FIG. 2, the client mobile device 101 includes one or more client applications 202 that interface to an operating system 204 and file sharing container 125. The file sharing container 125 includes client-to-server notification logic 206 that interfaces with the one or more client applications 202. When the one or more client applications 202 generate notification 126, the client-to-server notification logic 206 pushes the notification 126 to a client-to-server directory 208. The client-to-server notification logic 206 checks a mode 210 to determine whether the client mobile device 101 is running in a connected mode or disconnected mode. The mode 210 indicates the connected mode when the client mobile device 101 is in communication with the file sharing service 103 of FIG. 1, and the disconnected mode indicates that communication is not currently established between the client mobile device 101 and the file sharing service 103 of FIG. 1. If the mode 210 is the disconnected mode, a notification event entry 212 can be queued in a queue 214 until synchronization 124 of FIG. 1 is established between the client mobile device 101 and the file sharing service 103 of FIG. 1. The notification event entry 212 is associated with notification 126. The queue 214 can be used to establish an order or sequence when multiple notifications or other events are stored to the client-to-server directory 208. Alternatively, queuing functionality can be incorporated into the client-to-server directory 208, using for example, time or sequence tags.

When synchronization 124 of FIG. 1 is established between the client mobile device 101 and the file sharing service 103 of FIG. 1, a copy of the client-to-server directory 208 is stored with the notification 126 in the file sharing service 103. Therefore, if communication is lost between the client mobile device 101 and the file sharing service 103, the notification 126 can still be made available by the file sharing service 103 to the notification service 114 of FIG. 1. When the notification service 114 also establishes synchronization 128 with the file sharing service 103, the file sharing channel plugin 120D of FIG. 1 can receive an updated copy of the client-to-server directory 208 as a client-to-server directory 308 of FIG. 3 with the notification 126 from the file sharing service 103. After acting upon the notification 126 by sending one or more notification triggers 122 of FIG. 1, the file sharing channel plugin 120D of the notification service 114 of FIG. 1 can remove the notification 126 from the client-to-server directory 308 of FIG. 3. Changing data in the client-to-server directory 308 of FIG. 3 while synchronization 128 is established results in a corresponding change for the file sharing service 103 which propagates to the client-to-server directory 208 of FIG. 2. In exemplary embodiments, the client-to-server directory 208 supports a bi-directional data flow with callbacks, which can result in triggering the client application 202 that generated the notification 126 when new data is available or the notification 126 has been consumed.

Figure 3:
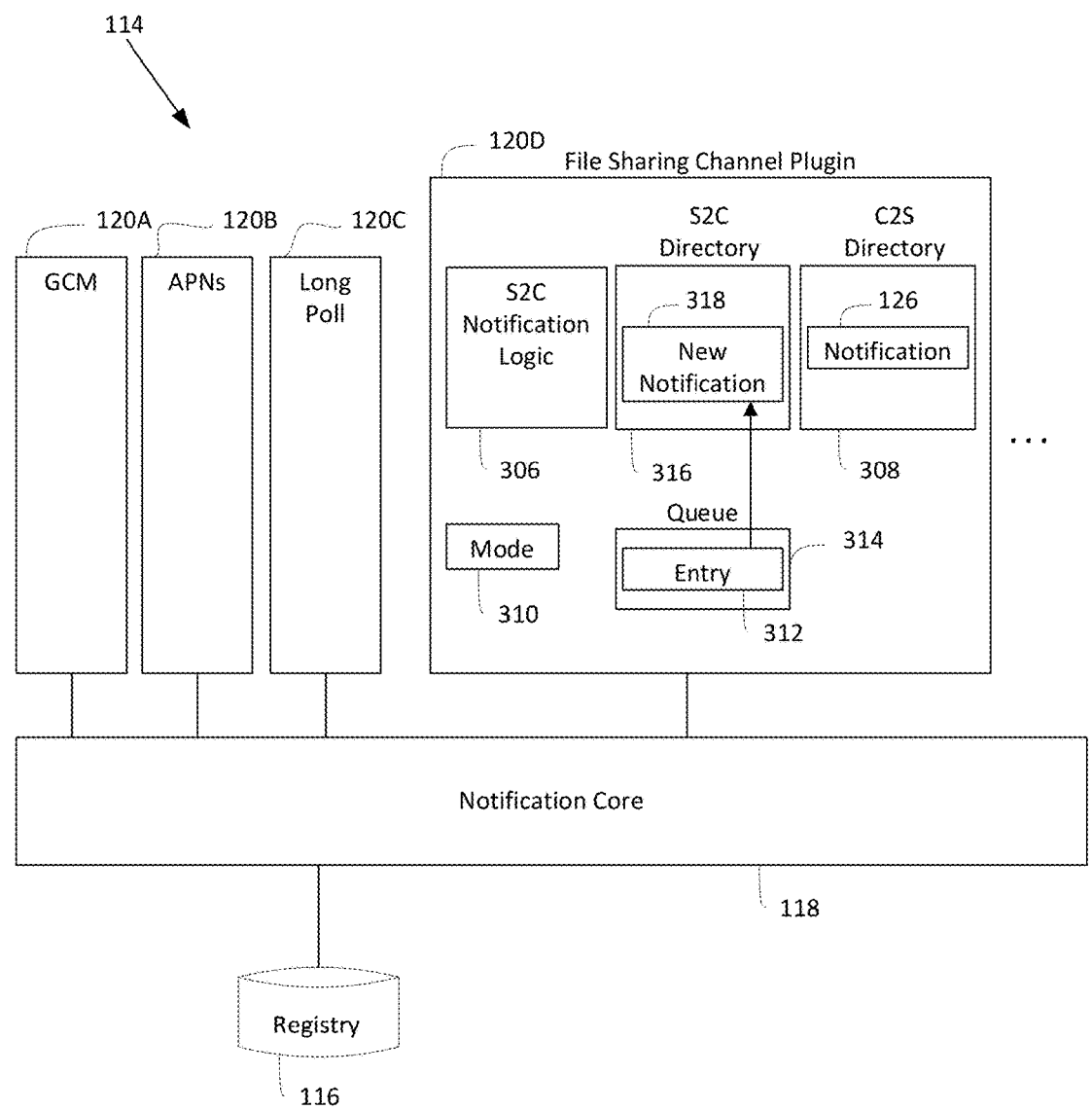
FIG. 3 depicts an example of a file sharing channel plugin according to an embodiment.

The file sharing container 125 may also be configured to access a copy of a server-to-client directory 216 which is made available by the notification server 114 of FIG. 1 through the file sharing service 103 as a synchronized copy of a server-to-client directory 316 of FIG. 3. The client-to-server notification logic 206 can monitor the server-to-client directory 216 for events or data, such as a new notification 318, and determine which of the one or more client applications 202 is intended to receive it. Similarly, client-to-server notification logic 206 can remove the new notification 318 and other events or data from the server-to-client directory 216 upon processing it, as well as provide other data values to return in response to the new notification 318. Removal of the new notification 318 from the server-to-client directory 216 when synchronization 124 and synchronization 128 are established results in removing the new notification 318 at the file sharing service 103 and correspondingly at the server-to-client directory 316 of FIG. 3. The server-to-client directory 316 of FIG. 3 can also support callbacks such that removal of the new notification 318 from the server-to-client directory 316 of FIG. 3 may result in a locally triggered event at the file sharing channel plugin 120D of FIG. 1. Although the client-to-server directory 208 and the server-to-client directory 216 are depicted separately in FIG. 2, it will be understood that they can be combined as a single directory and can further incorporate the queue 214 of FIG. 2.

FIG. 3 depicts an example of the file sharing channel plugin 120D in relation to the notification service 114 according to an embodiment. The file sharing channel plugin 120D may include server-to-client notification logic 306 that is configured to monitor the client-to-server directory 308, which is a synchronized copy of the client-to-server directory 208 of FIG. 2. Upon detecting a notification, such as notification 126, the server-to-client notification logic 306 can access the registry 116 to determine one or more endpoints if not specified in the notification 126, as well as which of the one or more channel plugins 120 should send one or more notification triggers 122 based on the notification 126. Each of the respective channel plugins 120 that is selected can send one or more notification triggers 122 depending on the number of endpoints involved. As previously described, the server-to-client notification logic 306 can remove the notification 126 from the client-to-server directory 308 upon processing the notification 126. When pushing the new notification 318 to the mobile client device 101 of FIG. 1 via the server-to-client directory 316, the file sharing channel plugin 120D may also have a mode 310 indication to support queuing of one or more event entries 312 in a queue 314 if the synchronization 118 of FIG. 1 is not established. The file sharing channel plugin 120D need not know whether the client mobile device 101 is presently in communication with the file sharing service 103, as the file sharing service 103 can retain copies of directories and data even if synchronization is lost. Although the client-to-server directory 308 and the server-to-client directory 316 are depicted separately, it will be understood that they can be combined as a single directory and can further incorporate the queue 314 of FIG. 3.

Figure 4:
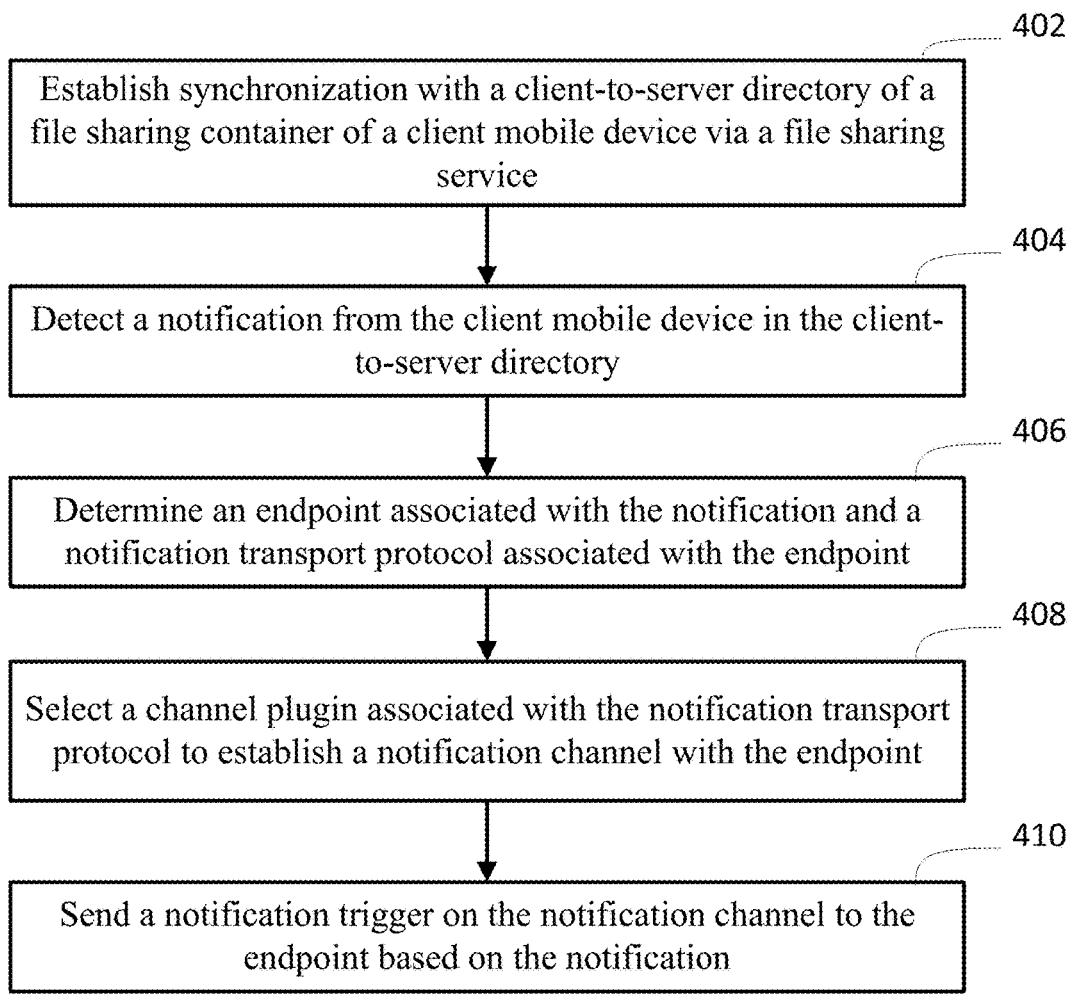
FIG. 4 depicts a flow diagram of a process for push notification according to an embodiment.

Turning now to FIG. 4, a process 400 for push notification will be described in accordance with an exemplary embodiment. The process 400 is described in reference to FIGS. 1-4 and can be implemented by the server system 102 of FIG. 1 in combination with the client mobile device 101, file sharing service 103, and target mobile devices 104A-N of FIG. 1. As previously described, the file sharing container 125 of the client mobile device 101 is configured to determine whether the client mobile device 101 is running in a connected mode or disconnected mode. Based on determining that the client mobile device 101 is running in the disconnected mode, the client mobile device 101 is configured to queue a notification 126 until the client mobile device 101 establishes synchronization 124 with the file sharing service 103. The notification 126 is stored in the file sharing service 103 for the notification service 114.

At block 402, the notification service 114 establishes synchronization 128 with the client-to-server directory 208 of the file sharing container 125 of the client mobile device 101 via the file sharing service 103. The file sharing channel plugin 120D of the notification service 114 is configured to establish synchronization 128 with the client-to-server directory 208 by synchronizing with the file sharing service 103, where the file sharing service 103 also establishes synchronization 124 with the client mobile device 101.

At block 404, the notification service 114 detects the notification 126 from the client mobile device 101 in the client-to-server directory 208, where the file sharing channel plugin 120D accesses a synchronized copy of the client-to-server directory 208 as client-to-server directory 308. The file sharing service 103 makes the notification 126 available to the file sharing channel plugin 120D in the client-to-server directory 308.

At block 406, the notification service 114 determines an endpoint, such as endpoint 123, associated with the notification 126 and a notification transport protocol associated with the endpoint 123. The notification service 114 is further configured to access the registry 116 to determine the notification transport protocol associated with the endpoint 123, where the registry 116 defines identifiers and notification transport protocols associated with a plurality of endpoints. For example, a subscribe/topic list can be included in the registry 116 that maps subscribed user identifiers, application identifiers, and/or device identifiers to topics and further maps device identifiers to notification transport protocols supported by the channel plugins 120A-N.

At block 408, the notification service 114 selects a channel plugin 120 associated with the notification transport protocol to establish a notification channel, such as notification channel 121, with the endpoint. The notification core 118 of the notification service 114 can interface the file sharing channel plugin 120D with a plurality of channel plugins 120 associated a plurality of notification transport protocols.

At block 410, the notification service 114 sends a notification trigger 122 on the notification channel 121 to the endpoint 123 based on the notification 126. The notification 126 may be a publish request targeting a plurality of end points, and the notification service 114 can be further configured to send notification triggers 122 to each of the end points. The notification service 114 can also remove the notification 126 from the client-to-server directory 308 based on sending the notification trigger 122, which results in removing the notification 126 from the client-to-server directory 208 due to file sharing service synchronization.

The notification service 114 can also create a new notification 318 in the server-to-client directory 316 which is synchronized with the server-to-client directory 216 of the file sharing container 125 of the client mobile device 101 via the file sharing service 103. The new notification 318 may be configured to notify one or more client applications 202 of the client mobile device 101 of an update. The file sharing container 125 of the client mobile device 101 can remove the new notification 318 from the server-to-client directory 216 based on detection of the new notification 318, which results in removal of the new notification 318 from the server-to-client directory 316 due to file sharing service synchronization. Removal can also be a callback triggering event to initiate a further action.

Figure 5:
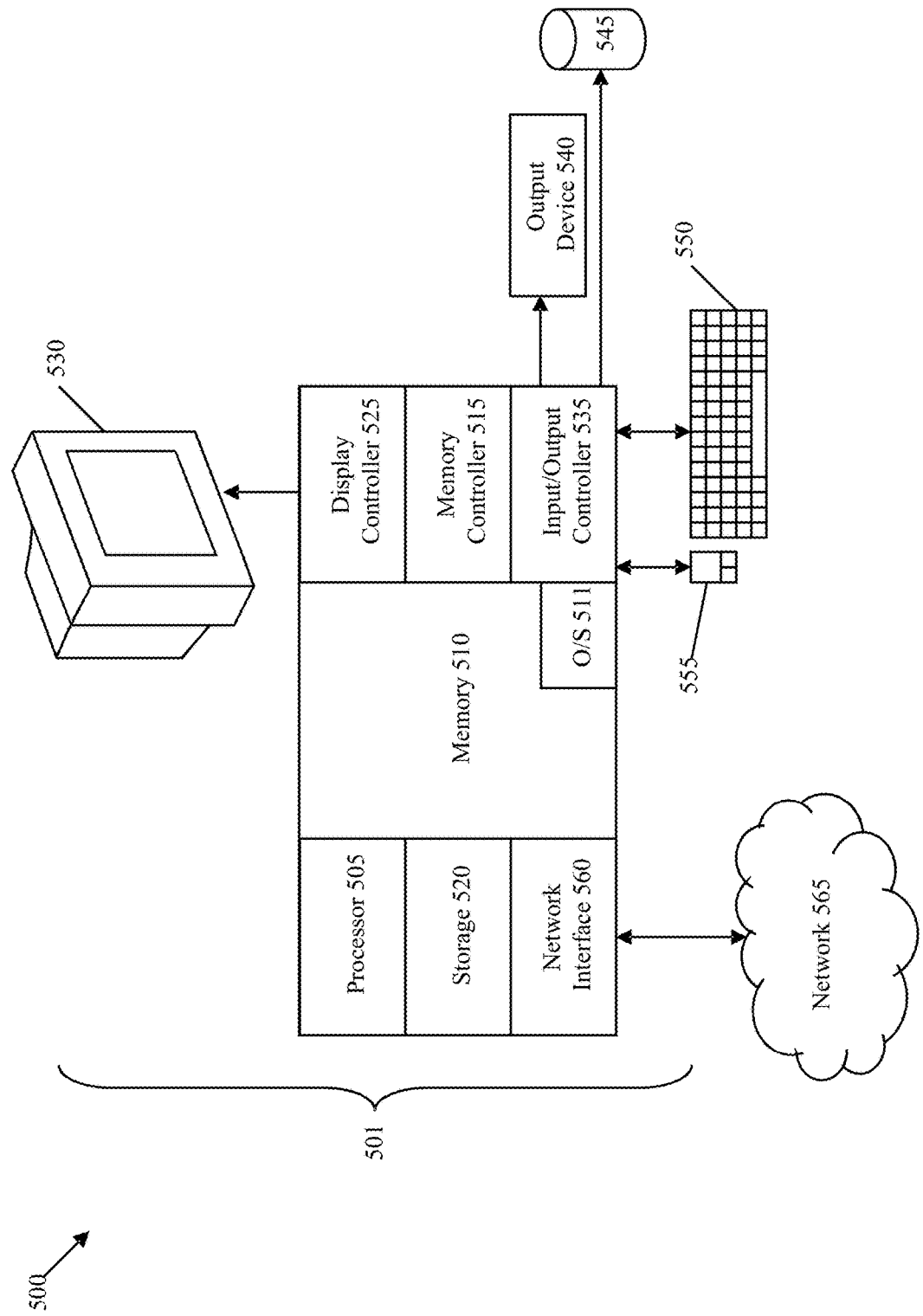
FIG. 5 depicts a further example of a block diagram of a system for push notification.

FIG. 5 illustrates a block diagram of a system 500 for push notification via file sharing service synchronization. The processes as previously described can be implemented in system 500 in hardware, software (e.g., firmware), or a combination thereof as part of a special or general-purpose digital computer, such as a personal computer, workstation, minicomputer, or mainframe computer. The system 500 therefore includes general-purpose computer 501 as illustrated in FIG. 5. The system 500 is a further example of the system 100 of FIG. 1, where the general-purpose computer 501 is an embodiment of the server system 102 of FIG. 1.

In an exemplary embodiment, in terms of hardware architecture, as shown in FIG. 5, the computer 501 includes a computer processor 505 and memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer processor 505 is a processing device for executing software, particularly software stored in storage 520, such as cache storage, or memory 510. The computer processor 505 can be any custom made or commercially available computer processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the computer processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the computer processor 505 is configured to execute instructions stored within the memory 510, to communicate data to and from the memory 510, and to generally control operations of the computer 501 pursuant to the instructions.

Technical effects include providing push notification via file sharing service synchronization in a mobile communication environment. Notification queuing can be performed at a client mobile device while the client mobile device is in a disconnected mode in order to maintain a sequence of events. Push notification middleware simplifies the interface at the client mobile device, as detailed knowledge of the target mobile devices is not needed by the client mobile device initiating the notification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:
1. A system, comprising:
a computer processor; and
a mobile platform server executable by the computer processor, the mobile platform server comprising a notification service, the notification service configured to:
   establish synchronization with a client-to-server directory of a file sharing container of a client mobile device via a file sharing service;
   detect a notification from the client mobile device in the client-to-server directory;
   determine an endpoint is not specified in the notification;
   determine, based on a determination that the endpoint is not specified in the notification, the endpoint associated with the notification and a notification transport protocol associated with the endpoint, using a registry, wherein the registry tracks relationships between applications, users, and endpoints;
   select a channel plugin associated with the notification transport protocol to establish a notification channel with the endpoint;
   send a notification trigger on the notification channel to the endpoint based on the notification; and
   create a new notification in a server-to-client directory synchronized with the file sharing container of the client mobile device via the file sharing service, the new notification configured to notify one or more client applications of a plurality of client mobile devices of an update, wherein the plurality of client mobile devices comprises the client mobile device;

wherein a file sharing channel plugin of the notification service is configured to establish synchronization with the client-to-server directory;

wherein the notification service further comprises a notification core configured to interface the file sharing channel plugin with a plurality of channel plugins associated a plurality of notification transport protocols;

wherein the client-to-server directory and the server-to-client directory both support bi-directional data flow with callbacks which results in a triggered event at the notification service.

2. The system of claim 1, wherein the notification service is further configured to remove the notification from the client-to-server directory based on sending the notification trigger.

3. The system of claim 1, wherein the file sharing container of the client mobile device is configured to determine whether the client mobile device is running in a connected mode or disconnected mode.

4. The system of claim 3, wherein based on determining that the client mobile device is running in the disconnected mode, the client mobile device is configured to queue the notification until the client mobile device establishes synchronization with the file sharing service.

5. The system of claim 1, wherein the file sharing container of the client mobile device is configured to remove the new notification from the server-to-client directory based on detection of the new notification.

6. The system of claim 1, wherein the notification is a publish request targeting a plurality of end points, and the notification service is further configured to send notification triggers to each of the end points.

7. The system of claim 1, wherein, to determine the endpoint, the notification service is further configured to: access the registry to determine the notification transport protocol associated with the endpoint, the registry defining identifiers and notification transport protocols associated with a plurality of endpoints.

8. A computer program product comprising a non-transitory computer readable storage medium having program code embodied therewith, the program code executable by a processing device for:

establishing synchronization with a client-to-server directory of a file sharing container of a client mobile device via a file sharing service;

detecting a notification from the client mobile device in the client-to-server directory;

determining an endpoint is not specified in the notification;

determining, based on a determination that the endpoint is not specified in the notification, the endpoint associated with the notification and a notification transport protocol associated with the endpoint, using a registry, wherein the registry tracks relationships between applications, users, and endpoints;

selecting a channel plugin associated with the notification transport protocol to establish a notification channel with the endpoint;

sending a notification trigger on the notification channel to the endpoint based on the notification;

and creating a new notification in a server-to-client directory synchronized with the file sharing container of the client mobile device via the file sharing service, the new notification configured to notify one or more client applications of a plurality of client mobile devices of an update, wherein the plurality of client mobile devices comprises the client mobile device;

wherein a file sharing channel plugin of a notification service is configured to establish synchronization with the client-to-server directory;

wherein the notification service further comprises a notification core configured to interface the file sharing channel plugin with a plurality of channel plugins associated a plurality of notification transport protocols;

wherein the client-to-server directory and the server-to-client directory both support bi-directional data flow with callbacks which results in a triggered event at the notification service.

9. The computer program product of claim 8, further comprising: removing the notification from the client-to-server directory based on sending the notification trigger.

10. The computer program product of claim 8, wherein the file sharing container of the client mobile device is configured to determine whether the client mobile device is running in a connected mode or disconnected mode.

11. The computer program product of claim 10, wherein based on determining that the client mobile device is running in the disconnected mode, the client mobile device is configured to queue the notification until the client mobile device establishes synchronization with the file sharing service.

12. The computer program product of claim 8, wherein the file sharing container of the client mobile device is configured to remove the new notification from the server-to-client directory based on detection of the new notification.

13. The computer program product of claim 8, wherein the notification is a publish request targeting a plurality of end points, and further comprising: sending notification triggers to each of the end points.

14. The computer program product of claim 8, wherein determining the endpoint further comprises: accessing the registry to determine the notification transport protocol associated with the endpoint, the registry defining identifiers and notification transport protocols associated with a plurality of endpoints.

* * * * *